Feb. 13, 1968  C. R. GRAUEL  3,368,370
UNIVERSAL JOINT

Original Filed June 1, 1965

INVENTOR.
CHARLES R. GRAUEL
BY
William N. Antonis
ATTORNEY

United States Patent Office 3,368,370
Patented Feb. 13, 1968

1

3,368,370
UNIVERSAL JOINT
Charles R. Grauel, South Bend, Ind., assignor to The Bendix Corporation, a corporation of Delaware
Continuation of application Ser. No. 460,040, June 1, 1965. This application Dec. 6, 1966, Ser. No. 599,646
2 Claims. (Cl. 64—21)

This application is a continuation of application Ser. No. 460,040 filed June 1, 1965, now abandoned.

This invention relates to universal joints and more particularly to universal joints of the constant velocity type in which torque is transmitted from a primary (input) shaft to a secondary (output) shaft through a variable angle by means of power transmitting elements.

More specifically, this invention relates to improvements in a constant velocity universal joint of the type described in Breuer et al. Patent No. 3,162,024 in which a plurality of balls are utilized to transmit rotary motion from an input shaft to an output shaft in such a manner that the speed ratio between the input and output shafts remains constant in all portions of the cycle of each rotation of the shafts, no matter what the relative angular position of the shafts and their axes may be.

To this end it is an object of this invention to provide a constant velocity universal joint which in and of itself will permit a substantial amount of relative axial movement between the input and output shafts at all angular positions of said shafts.

Another object of this invention is to provide a constant velocity universal joint which permits a maximum amount of relative axial movement between the input and output shafts in a simpler and a less expensive manner than has heretofore been possible.

A further object of this invention is to provide a constant velocity universal joint of the type described which can be easily assembled and disassembled in a minimum amount of space.

A still further object of this invention is to provide a constant velocity universal joint comprising an outer hollow member and an inner member, a plurality of power transmitting balls for transmitting torque from one of the members to the other of said members, and control means for maintaining all of said balls in a common plane, said control means including a cage intermediate said outer and inner members and a ball joint fixedly connected to said cage and in engagement with the end of said inner member.

More specifically, it is an object of this invention to provide a constant velocity universal joint of the type described wherein the cage of said control means includes a spherical portion which pivots on the inside diameter of the outer hollow member, and the ball joint of said control means pivots in a socket formed in the end of the inner member shaft.

The above and other objects, features, and advantages of this invention will become apparent from the following description taken in connection with the accompanying drawing which forms a part of this invention and in which.

2

Figure 1:
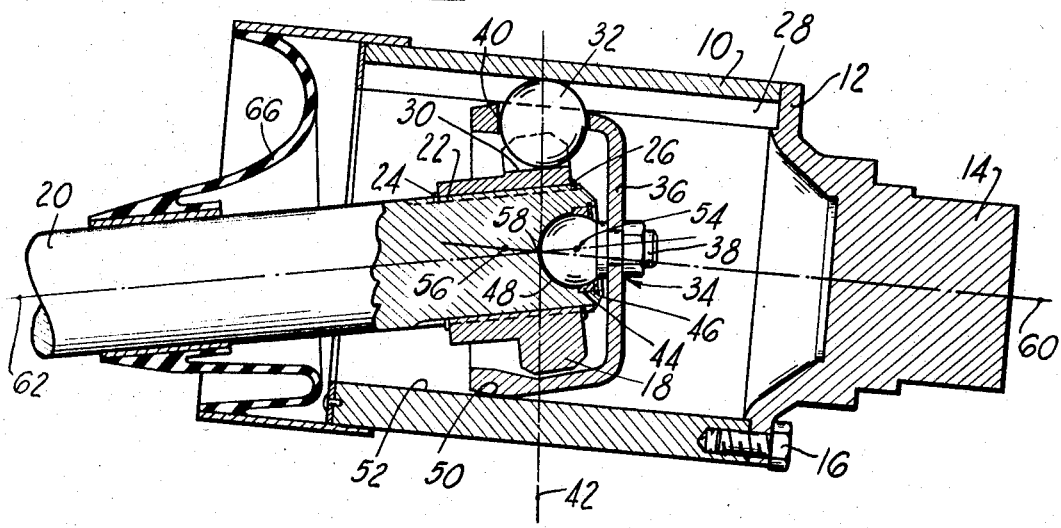
FIGURE 1 is a sectional view through a universal joint constructed in accordance with the invention, said section being taken along line 1—1 of FIGURE 2 and shown with the input and output shafts angularly disposed with respect to each other.
Figure 4:
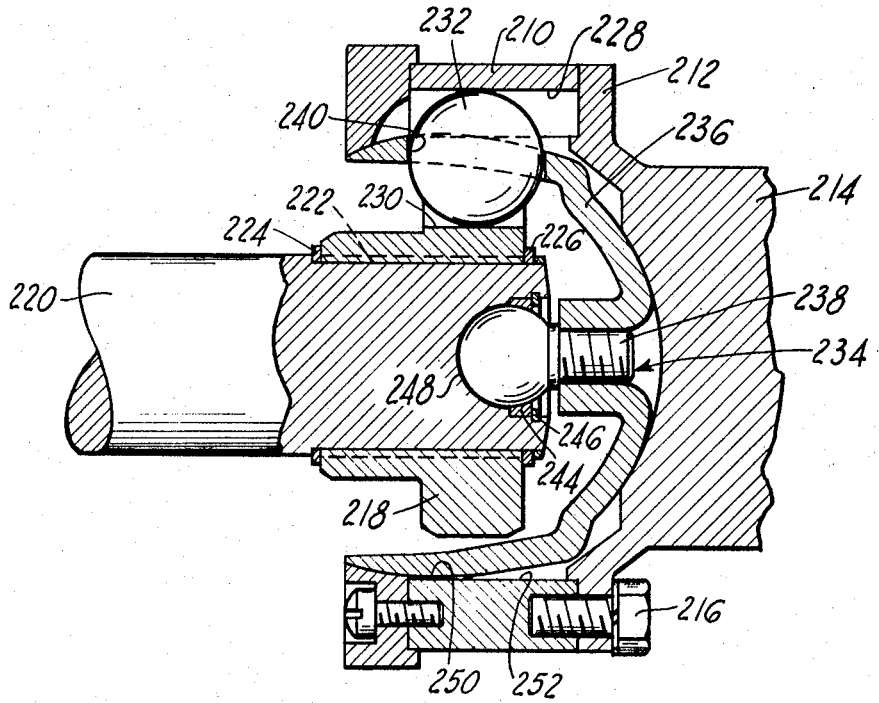

FIGURE 4 is a sectional view similar to FIGURE 1 showing a universal joint embodiment without end motion.

Figure 2:
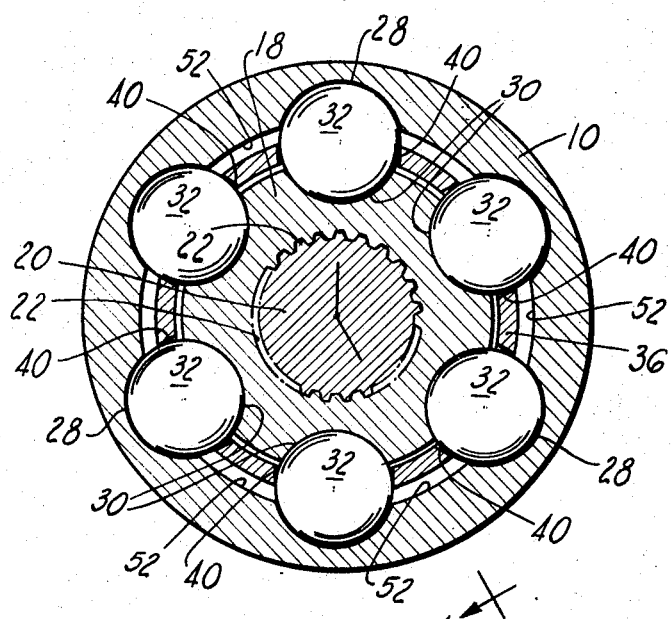
FIGURE 2 is a sectional view taken substantially along the homokinetic plane of FIGURE 1.
Figure 3:
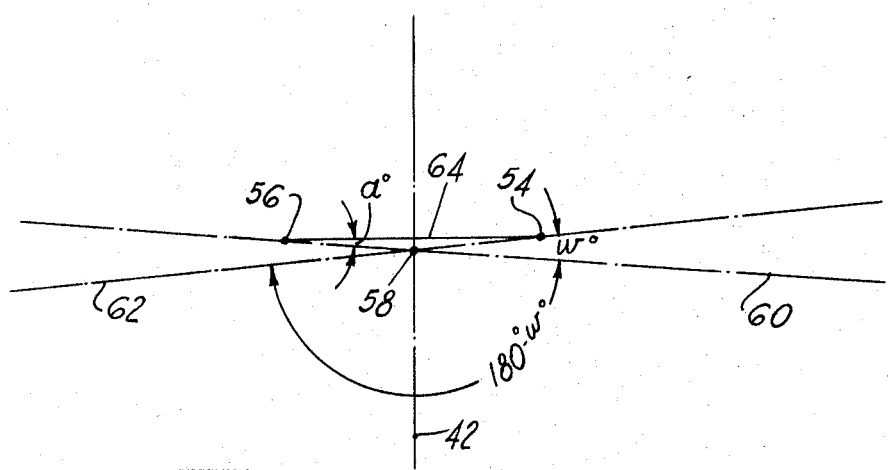
FIGURE 3 is a diagrammatical view showing the angular relationship of the universal joint components for achieving constant velocity.

Referring to FIGURES 1, 2 and 3, it will be seen that numeral 10 indicates an outer hollow cylindrical member which is adapted to be secured to the flange 12 of shaft 14 through suitable means such as bolts 16, only one of which is shown. An inner ring member 18 is located within the outer hollow cylindrical member 10 and is fixedly connected to shaft 20 through suitable means such as splines 22 and snap rings 24 and 26.

Formed on the inner cylindrical surface of the outer member 10 are six parallel straight race grooves 28 which are arranged to form cylindrical spaces with six corresponding parallel straight race grooves 30 formed on the outer cylindrical surface of inner ring member 18. Six power transmitting balls 32, one of which movably engages each corresponding set of straight race grooves 28 and 30, are utilized for transmitting torque from the outer member 10 to the inner member 18, or vice versa. In order for the device to transmit torque at constant angular velocity, it is necessary to maintain the power transmitting balls 32 in a common plane which bisects the obtuse angle (180°−ω°) formed by the shafts 14 and 20. This plane, which bisects the obtuse shaft angle, is known as the homokinetic plane. In order to maintain the balls 32 in this homokinetic plane at any joint angle, a control lever, indicated generally by the numeral 34, is utilized. This control lever consists of a cage 36, which is located intermediate the outer and inner members 10 and 18, and a ball stud 38, which is rigidly attached to the cage. The cage includes six slot type apertures 40, each of which contains one of the balls, for maintaining the balls in a common plane 42. The ball stud 38 is held in position by retaining rings 44 and 46 and is free to pivot in a socket seat 48 formed in the end of the inner member shaft 20. A spherical portion 50 formed on the outer diameter of cage 36 permits the cage to pivot on the lands 52 of the outer member 10, and in conjunction with the ball stud locates the cage in the proper radial position. The surface of the lands 52 is in effect the inside diameter of the outer member 10.

As seen in FIGURES 1 and 3, the pivot or center point 54 of the ball stud 38 and the pivot or center point 56 of the cage 36 are located on opposite sides and equidistant from ball plane 42. In other words, pivot points 54 and 56 are equidistant from center point 58 of the universal joint which is located at the common intersection of center line 60 of shaft 14, center line 62 of shaft 20, and ball plane 42. Because of this equidistant relationship, the line 64 connecting pivot points 54 and 56, which line is also the axis of cage 36, forms an angle with each of the axes 60 and 62 of shafts 14 and 20, respectively, which is exactly one-half the angle formed by the shafts 14 and 20. In other words, the angle "α" is exactly one-half the angle "ω." By utilizing such a relationship, the balls 32 are maintained in the homokinetic plane and constant velocity is achieved. In the foregoing relationship it will be noted that the center point 54 is always on the center line 62 of the inner member shaft 20, that the center point 56 of the cage 36 is always on the center line 60 of the outer member shaft 14, and that the center point 58 is always at the intersection of shaft center lines 60 and 62 and in the homokinetic plane 42. Thus, the described universal joint comprises two relatively movable unitary assemblies, one of which includes the outer hollow cylindrical member 10 and shaft 14, and the other of which includes the inner ring member 18, shaft 20, balls 32, cage 36, and ball stud 38. In order to protect the universal joint from ingress of dirt and the escape of lubricant, a flexible impervious boot 66 is suitably connected to the outer member 10 and the shaft 20.

Operation of the universal joint will be as follows: As illustrated in FIGURE 1, when the shafts 14 and 20 are moved angularly with respect to each other, such angular movement will cause the ball stud 38 of the control lever 34 to pivot within socket seat 48 and the spherical portion 50 of cage 36 of the control lever to pivot on the inside diameter 52 of the outer member 10. Such pivoting of the control lever results in a given angular movement of the cage, such angular movement being one-half the relative angular movement of the shafts which will have the effect of placing the balls in the homokinetic plane previously described.

By utilizing corresponding parallel straight race grooves 28 and 30 on the outer and inner members 10 and 18, respectively, it is possible to create a constant velocity universal joint which will provide substantial axial movement of one of the shafts 14 or 20 with respect to the other at all angular positions within the design parameters. The fact that the shafts 14 and 20 are moving axially with respect to each other as well as angularly with respect to each other does not affect the homokinetic plane of the balls, since the two unitary assemblies of the joint, which were previously described, are functionally in the same operative position for angular movements regardless of the relative axial positions therebetween.

In the previously described universal joint, when the shafts are at an angle with respect to each other, the balls will roll in their respective race grooves as they are moved through their homokinetic plane. As the shafts move axially with respect to each other, the balls will slide in their races. However, in most applications, the shafts will never move axially without also moving through an angle and rotating. As a result, there will never be true sliding but a combination of rolling and sliding.

Referring to FIGURE 4, it will be seen that the principles of the foregoing end motion universal joint have been utilized in connection with a universal joint which does not have end motion. In other words, the primary and secondary shafts cannot move axially with respect to each other. In FIGURE 4, like parts have been identified with like numerals plus 200. The operation of this embodiment is the same as that of the FIGURE 1 embodiment, except for the lack of end motion, and will not be described again.

The advantages and many applications of a universal joint of the type described will be obvious to those skilled in the art. Furthermore, although this invention has been described in connection with certain specific embodiments, it will be obvious to those skilled in the art that various changes may be made in the form, structure and arrangement of parts without departing from the spirit of the invention.

Accordingly, I do not desire to be limited to the specific embodiments disclosed herein primarily for purposes of illustration, but instead, desire protection falling within the scope of the appended claims.

Having thus described the various features of the invention, what I claim as new and desire to secure by Letters Patent is:

1. A universal joint comprising outer and inner members whose axes intersect at variable angles, a plurality of lands located within said outer member and on said inner member for forming a plurality of corresponding ball race grooves in said members, said ball race grooves of said outer and inner members being parallel to the respective axes of said members, a plurality of power transmitting balls movably engaging the corresponding grooves of said members for transmitting torque from one of said members to the other of said members, and control means for maintaining said balls in a plane which bisects the obtuse angle formed by the axes of said members, said control means including a ball retaining cage having an outer spherical surface formed thereon for pivotally engaging the lands on said outer member, said spherical surface having a pivot point which is spaced from said ball plane and is located on the axis of said outer member, a ball stud having the stud end rigidly connected to said cage and the ball end pivotally connected to the end of said inner member, said ball end having a pivot point which is spaced from said plane and is located on the axis of said inner member.

2. A universal joint, as defined in claim 1, wherein the pivot point of said ball stud is located nearer the end of said inner member than the pivot point of said spherical surface.

References Cited
UNITED STATES PATENTS

| | | | |
|---|---|---|---|
| 2,352,776 | 7/1944 | Dodge | 64—21 |
| 2,911,805 | 11/1959 | Wildhaber | 64—21 |
| 3,162,026 | 12/1964 | Ritsema | 64—21 |
| 3,176,476 | 4/1965 | Cull | 64—8 |

HALL C. COE, *Primary Examiner.*